(12) United States Patent
Wan et al.

(10) Patent No.: US 10,730,437 B2
(45) Date of Patent: Aug. 4, 2020

(54) ELECTRIC FOLDING DEVICE FOR OUTER REARVIEW MIRROR OF A VEHICLE

(71) Applicant: NINGBO JINGCHENG CAR INDUSTRY CO., LTD., Ningbo (CN)

(72) Inventors: Heng Wan, Ningbo (CN); Guoda Yan, Ningbo (CN); Zhengdong Jiang, Ningbo (CN); Zhenning Shu, Ningbo (CN)

( * ) Notice: Subject to any disclaimer, the term of this patent is extended or adjusted under 35 U.S.C. 154(b) by 254 days.

(21) Appl. No.: 15/901,876

(22) Filed: Feb. 21, 2018

(65) Prior Publication Data

US 2018/0178728 A1 Jun. 28, 2018

Related U.S. Application Data

(63) Continuation of application No. PCT/CN2016/073431, filed on Feb. 4, 2016.

(30) Foreign Application Priority Data

Aug. 22, 2015 (CN) .......................... 2015 1 0518913

(51) Int. Cl.
*B60R 1/07* (2006.01)
*B60R 1/074* (2006.01)

(52) U.S. Cl.
CPC .............. *B60R 1/07* (2013.01); *B60R 1/074* (2013.01)

(58) Field of Classification Search
CPC ....... B60R 1/06; B60R 1/0607; B60R 1/0612; B60R 1/062; B60R 1/07; B60R 1/072; B60R 1/074
USPC .......................... 359/841, 843, 844, 871–877
See application file for complete search history.

(56) References Cited

U.S. PATENT DOCUMENTS

| | | | |
|---|---|---|---|
| 6,022,113 A | 2/2000 | Stolpe et al. | |
| 6,390,630 B1 * | 5/2002 | Ochs ........................ | B60R 1/074 248/478 |
| 7,374,299 B2 * | 5/2008 | Brouwer ................ | B60R 1/074 359/841 |

(Continued)

FOREIGN PATENT DOCUMENTS

| | | |
|---|---|---|
| CN | 1938178 A | 3/2007 |
| CN | 1938179 A | 3/2007 |

(Continued)

OTHER PUBLICATIONS

English machines translation of EP-2548770-A1 (Year: 2013).*

*Primary Examiner* — Nicholas R. Pasko
(74) *Attorney, Agent, or Firm* — Bayramoglu Law Offices LLC

(57) ABSTRACT

An electric folding device for an outer rearview mirror includes a shell, a foundation bed, a base, a pin shaft, an electric driving unit used for driving the shell to rotate relative to the base around the axis of the pin shaft. A spring is arranged on the pin shaft in a sleeving mode, and a connecting piece is provided, which makes the shell manually rotate relatively to the foundation bed. A cam assembly is provided among the connecting piece, the foundation bed and the base. During the electric folding process, driven by the electric driving unit, the cam assembly enables the foundation bed to lift up and rotate along the pin shaft through the relative slide of the cam assembly and the elastic force of the spring. The device is compact in structure with better anti-jitter performance and smooth electric folding.

8 Claims, 4 Drawing Sheets

(56) References Cited

U.S. PATENT DOCUMENTS

| | | | |
|---|---|---|---|
| 7,543,949 B2* | 6/2009 | van den Brink | B60R 1/074 |
| | | | 248/479 |
| 7,547,855 B2* | 6/2009 | Brouwer | B60R 1/074 |
| | | | 200/405 |
| 8,313,202 B2 | 11/2012 | van Stiphout et al. | |
| 8,628,200 B2 | 1/2014 | van Stiphout et al. | |
| 2010/0238570 A1* | 9/2010 | Reedman | B60R 1/076 |
| | | | 359/841 |
| 2012/0087026 A1* | 4/2012 | Schuurmans | B60R 1/074 |
| | | | 359/841 |
| 2013/0242423 A1* | 9/2013 | Palvoelgyi | B60R 1/074 |
| | | | 359/841 |
| 2013/0321941 A1* | 12/2013 | van Stiphout | B60R 1/06 |
| | | | 359/877 |
| 2014/0347755 A1* | 11/2014 | Mendoza Vicioso | B60R 1/074 |
| | | | 359/841 |

FOREIGN PATENT DOCUMENTS

| | | |
|---|---|---|
| CN | 101466570 A | 6/2009 |
| CN | 202624064 U | 12/2012 |
| CN | 103237684 A | 8/2013 |
| CN | 204488646 U | 7/2015 |
| CN | 105034957 A | 11/2015 |
| CN | 204821345 U | 12/2015 |
| EP | 2548770 A1 * 1/2013 | ............. B60R 1/074 |

* cited by examiner

US 10,730,437 B2

ELECTRIC FOLDING DEVICE FOR OUTER REARVIEW MIRROR OF A VEHICLE

CROSS-REFERENCE TO RELATED APPLICATIONS

This application is a continuation of International Patent Application No. PCT/CN2016/073431 with a filing date of Feb. 4, 2016, designating the United States, now pending, and further claims priority to Chinese Patent Application No. 201510518913.7 with a filing date of Aug. 22, 2015. The content of the aforementioned applications, including any intervening amendments thereto, are incorporated herein by reference.

TECHNICAL FIELD

The present disclosure relates to the field of outer rearview mirror of a vehicle, in particular to an electric folding device for outer rearview mirror of a vehicle.

BACKGROUND

The outer rearview mirrors of a vehicle, as important accessories for observing vehicles or pedestrians behind are important elements to facilitate safe driving, and enable the driver to observe a particular field of view by the adjustment of the angles. The importance of the outer rearview mirrors is universally acknowledged. Normally the folding device is electrically driven to avoid the inconvenience of driving in a narrow space or colliding with the pedestrian or vehicle damage caused by unnecessary dispute in complex occasions since the outer rearview mirrors are mounted on the two sides of the vehicle. The electric folding, device is generally rotatably mounted between the mirror substrate and the mirror support fixed on a vehicle to achieve the folding function. In order to reduce the frictional resistance between the mirror substrate and the mirror support when folding, a certain gap is reserved between the two when the electric folding device is designed. The problem is that, the lower end surface of the mirror substrate lacks support by the mirror support due to the gap, and the mirror substrate is solely supported by a pin shaft for folding, and tightly pressed by the spring sleeve-mounted on the pin shaft, during driving, especially when driving fast or on bumping roads, shaking may occur as the poor anti-shudder capability. In addition, the gap may cause large wind noise, and the mirror substrate and the mirror support are all injection-molded with plastic material, which is prone to aging after a long-time use, meanwhile, other factors such as the inclusion of wind or sand, the resistance caused by rotation may occur, with a high operational current, phenomenon of folding failure may take place.

SUMMARY

In views of the above shortcomings, the present disclosure provides a folding device for the outer rearview mirrors of vehicles with compact structure, better anti-jitter performance, smooth electric folding process, and less folding failure.

The technical scheme of the present disclosure is as follows: an electric folding device for outer rearview mirror of a vehicle, comprising a shell fixedly installed on the mirror substrate, a foundation bed fixed on the shell, a base fixed on the mirror support, a pin shaft for rotatable connection, an electric driving unit used for driving the shell to rotate relatively to the base around the axis of the pin shaft, a spring arranged on the pin shaft in a sleeving mode, and a connecting piece which makes the shell manually rotate relatively to the base, the connecting piece is pressed on the foundation bed by the pre-tightening force of the spring, a cam assembly is provided among the connecting piece, the foundation bed and the base, during the electric folding process, driven by the electric driving unit, the cam assembly enables the foundation bed to lift up and rotate along, the pin shaft through the relative slide of the cam assembly and the elastic force of the spring.

In comparison with the prior art, the present disclosure are of prominent advantages. When the outer rearview mirror is being folded electrically, driven by the electric driving unit, the foundation bed is lifted up and rotates along the pin shaft through the elastic force of the spring and the relative slide of the cam assembly set among the connecting piece, the foundation bed and the base. During the folding process the foundation bed is lifted upwards together with the shell, that is to say, the mirror substrate is also lifted upward. The mirror substrate and the mirror support are separated to a certain distance during the folding and rotating process, thus less rotation resistance to ensure a smoother folding process, and fewer failed phenomena during folding, such as stuck or not be folded in place. Thanks to the above electric lifting function of the folding device, the mirror substrate and the mirror support can be tightly attached during the design of the outer rearview mirror. Therefore, the mirror substrate and the shell can be better supported by the mirror support, less shaking when driving and less wind noise.

Preferably, the cam assembly comprises a connecting cam arranged on the lower end surface of the connecting piece, a first base cam arranged on the upper end surface of the foundation bed matched with the connecting cam, a second base cam arranged on the lower end surface of the foundation bed, and a base cam arranged on the upper end surface of the base and matched with the second base cam. The overall structure of the cam assembly is very compact, and the cam assembly are processed from parts of folders in the prior art while the lifting function is realized with low cost and small size.

Preferably, the connecting cam is located on the first base cam, and the second base cam embedded with the base cam when the vehicle is in a running state; during the folding process of the rearview mirror, the first base cam and, the connecting cam slide relatively, the first base cam embedded with the connecting cam, the second base cam and the base cam slide relatively, the second base cam, operates on the base cam. In this way, the connecting cam, the first base cam, the second base cam and the base cam are respectively provided with a reasonable position, so that the lifting function of the foundation bed can be easily achieved. In the real practice, the faster the lifting, the smaller the folding resistance and the folding effect will also be better.

Preferably, it further comprises a positioning mechanism for limiting the connecting piece, the positioning mechanism comprises a positioning member for blocking and an annular positioning boss arranged on the upper end of the connecting piece, the outer peripheral wall of the positioning boss is provided with at least one positioning block matched with the end of the positioning member, one side of the positioning block is arc-shaped to rotate relatively to the positioning member while the other side of the positioning block can be used to abut against the end of the positioning member as a stopping edge for limitation. The end of the positioning member abuts against the stopping edge of the limiting block when the vehicle is in the running state. This positioning mechanism can be used for limiting the initial position of the connecting piece and the position of the connecting piece can be well kept during initial assembly or when the electric reset is not complete during use, avoiding the phenomenon that the lifting is not in place caused by staggered cam assembly.

One end of the positioning member is in rotatable connection with, the foundation bed, an elastic component is arranged between the positioning member and the base for elastic reset, one side of the foundation bed inner wall is provided with an inwardly-extending mounting platform, one end of the positioning member is in a rotary sleeving installation with a vertically arranged rotating shaft on the mounting platform, the elastic component is an elastic sheet integrally formed with the positioning member, one side of the elastic sheet abuts against the inner wall of the foundation bed, and the spacing for elastic displacement arranged between the other side of the elastic sheet and the positioning member. Since the positioning member is integrally formed with the elastic piece, the mounting space is small, the assembly is convenient, the positioning is direct and of good effect, and certain stuck conditions are avoided.

Preferably, the electric driving unit includes large gear mate matched with trans worm, and the large gear is integrated with the connecting piece. Thus the overall structure is more compact and cost-effective.

Preferably, a plurality of convex blocks are arranged along the circumferential intervals of the lower end surface of the connecting piece, a slope surface is arranged on the two sides of the convex block, a plurality of grooves matched with the convex blocks arranged on the base along the circumferential direction and corresponding with the intervals, the two sides of the groove are respectively provided with an inclined surface matched with the slope surface, the connecting cam is arranged on the outer ring of the convex blocks along the circumferential direction, the base cam is arranged on the outer ring of the grooves along the circumferential direction. By designing the cam assembly on an existing connecting piece and a base connecting piece, the structure is more compact to guarantee the coaxiality and the mounting accuracy without redundant parts.

Preferably, a mounting cap matched with the shell is arranged at the upper end of the pin shaft, a plurality of fasteners are provided at the lower end of the pin shaft along the circumferential direction to buckle with the mounting part of the mirror support. The pin shaft and the folding device can be conveniently installed through the fasteners at the lower end of the pin shaft.

Preferably, the lower end surface of base is fixedly connected with the pin shaft through an annular clamping piece, a plurality of clamping pins are obliquely arranged at the inner ring along the circumferential intervals, a tapered segment arranged in the middle part of the pin shaft corresponding to the position of the clamping piece, the pin shaft is provided with a plurality of clamping grooves along the circumferential direction to be clamped with the clamping pins. In this way, the fixing effect of the clamping piece is better, and the pre-tightening force of the spring can also be well guaranteed.

Figure 1:
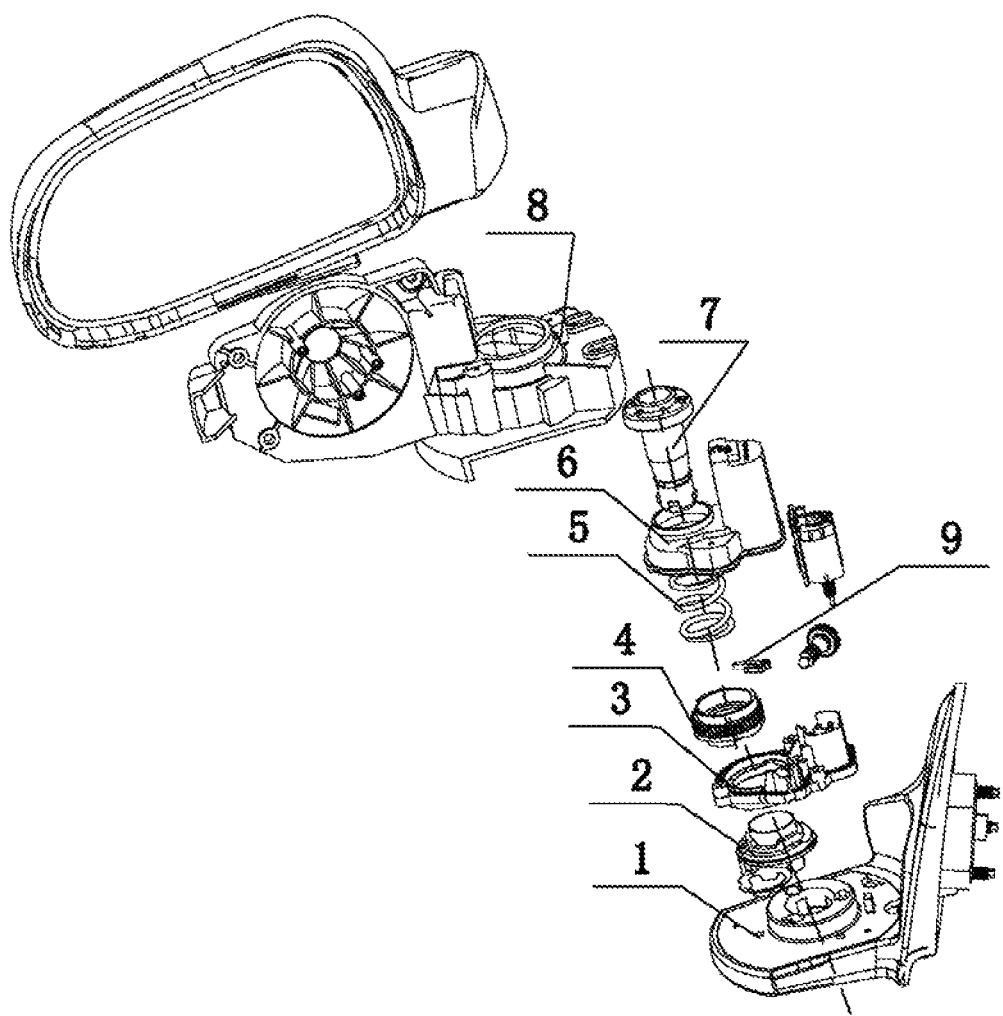
FIG. 1 is an exploded structural diagram of an electric folding device for outer rearview mirror of a vehicle, a mirror support and a mirror are basically matched of the present disclosure.
Figure 2:
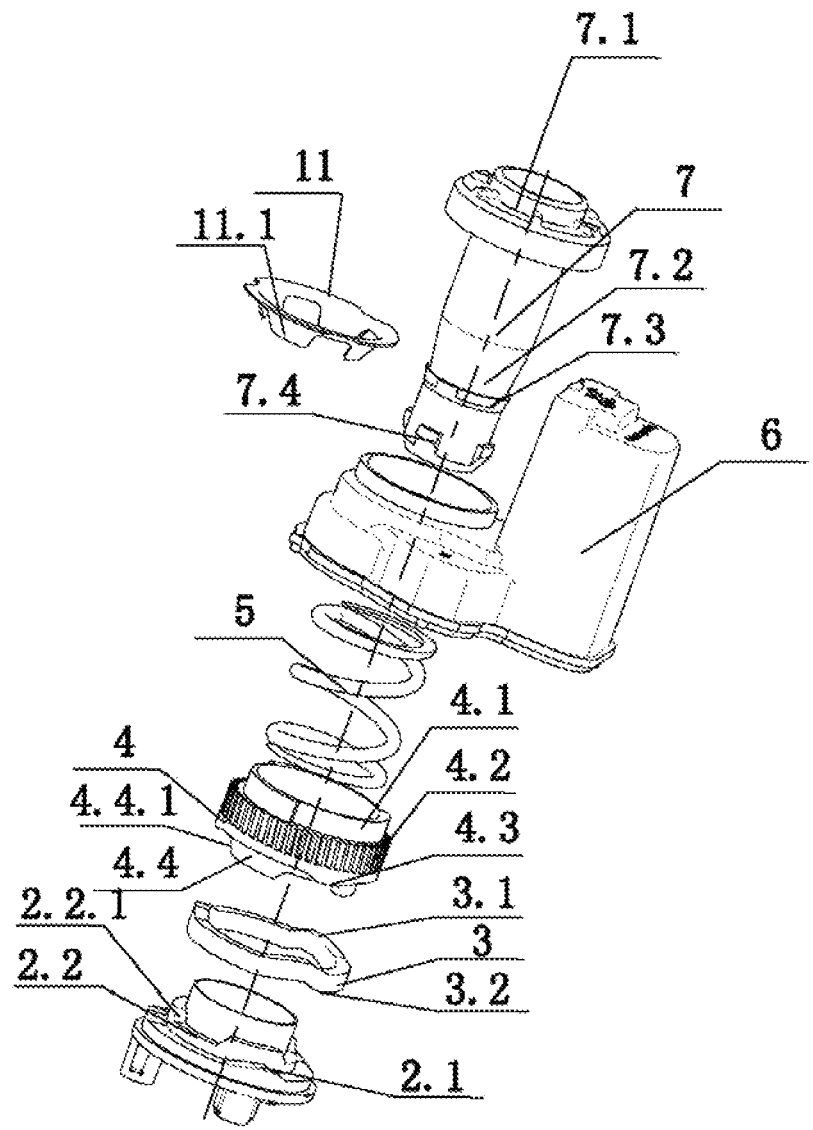
FIG. 2 is an exploded structural diagram of an electric folding device for outer rearview mirror of a vehicle (the cam part is exposed) of the present disclosure.
Figure 3:
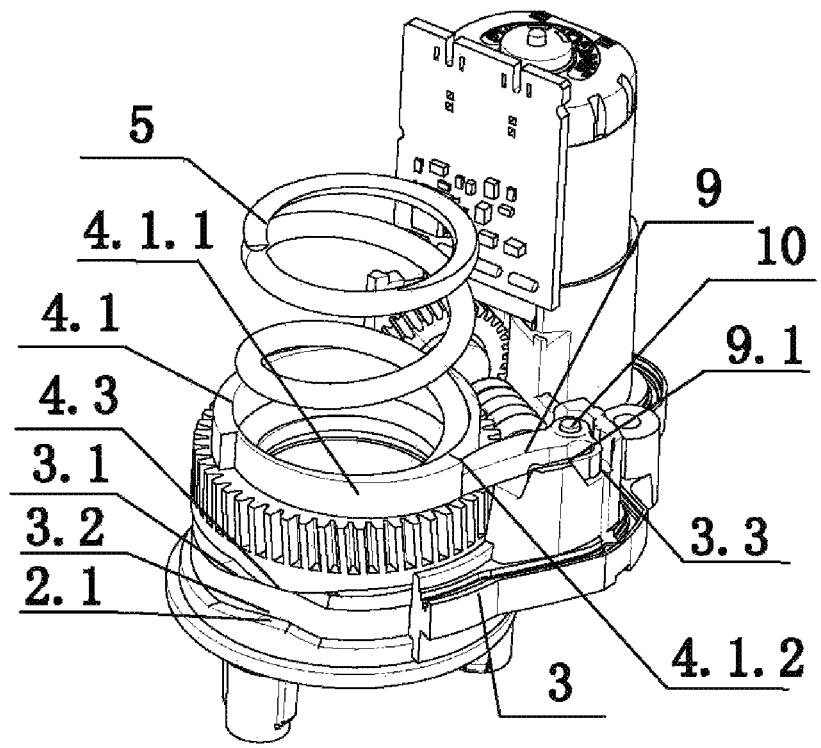
FIG. 3 is a schematic structural diagram for assembly of an electric folding device for outer rearview mirror of a vehicle (without the shell and the pin shaft) of the present disclosure.

Numerical references in FIGS. 1-6: 1 mirror support, 1.1 mounting part, 2 base, 2.1 base cam, 2.2 groove, 2.2.1 inclined surface, 3 foundation bed, 3.1 first base cam, 3.2 second base cam, 3.3 mounting platform, 4 connecting piece, 4.1 positioning boss, 4.1.1 positioning block, 4.1.2 stopping edge, 4.2 large gear, 4.3 connecting cam, 4.4 convex block, 4.4.1 a slope surface, 5 spring 6 shell, 7 pin shaft, 7.1 mounting cap, 7.2 tapered segment, 7.3 clamping grooves, 7.4 fasteners, 8 mirror substrate 9 positioning member, 9.1 elastic piece, 10 rotating shaft, 11 clamping piece, 11.1 clamping pin.

DETAILED DESCRIPTION

The present disclosure would be, described in greater detail hereinafter in combination with the accompanying drawings and embodiments.

In the present description, it should be understood that, the terms "upper", "lower", "inner", "outer" and the like indicate the direction or the position based on the position and relation described in the figure, is merely to facilitate the description of the present disclosure or for simplification, not indicating a specific orientation.

An electric folding device for outer rearview mirror of a vehicle, comprising a shell 6 fixedly installed on the mirror substrate 8, a foundation bed 3 fixed on the shell 6, a base 2 fixed on the mirror support 1, a pin shaft 7 for rotatable connection, an electric driving unit used for driving the shell 6 to rotate relatively to the base 2 around the axis of the pin shaft 7, a spring 5 arranged on the pin shaft 7 in a sleeving mode, and a connecting piece 4 which makes the shell 6 manually rotate relatively to the base 2, the connecting piece 4 is pressed on the foundation bed 3 by the pre-tightening force of the spring 5, a cam assembly is provided among the connecting piece 4, the foundation bed 3 and the base 2, during the electric folding process, driven by the electric driving unit, the cam assembly enables the foundation bed 3 to lift up and rotate along the pin shaft 7 through the relative slide of the cam assembly and the elastic force of the spring 5.

The cam assembly comprises a connecting cam 4.3 arranged on the lower end surface of the connecting piece 4, a first base cam 3.1 arranged on the upper end surface of the foundation bed 3 matched with the connecting cam 4.3, a second base cam 3.2 arranged on the lower end surface of the foundation bed 3, and a base cam 2.1 arranged on the upper end surface of the base 2 and matched with the second base cam 3.2.

Figure 4:
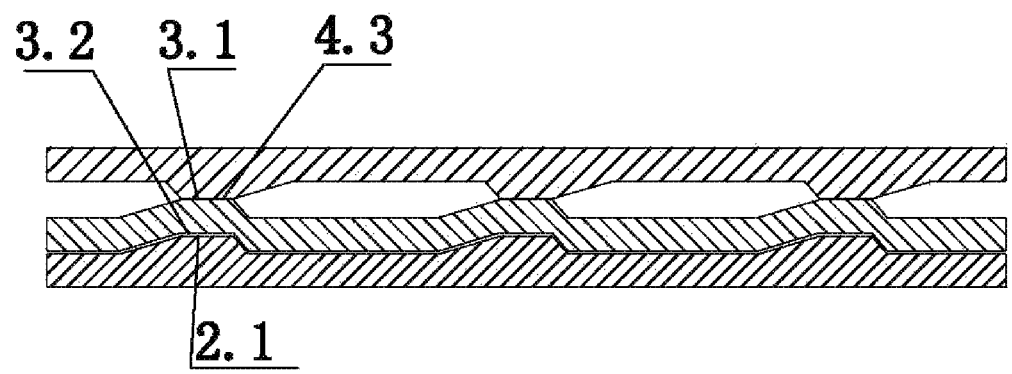
FIG. 4 is a schematic view of a cam assembly of an electric folding device for outer rearview mirror of a vehicle (running state) of the present disclosure.
Figure 5:
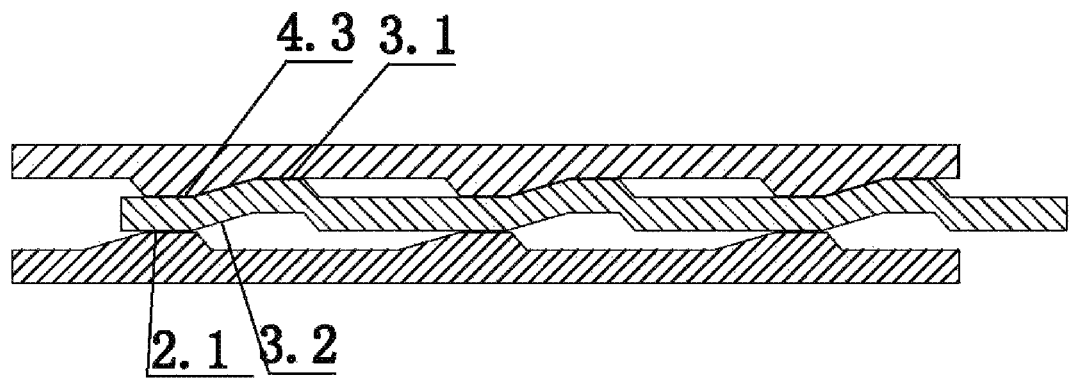
FIG. 5 is a schematic view of a cam assembly of an electric folding device for outer rearview mirror of a vehicle (folding state) of the present disclosure.
Figure 6:
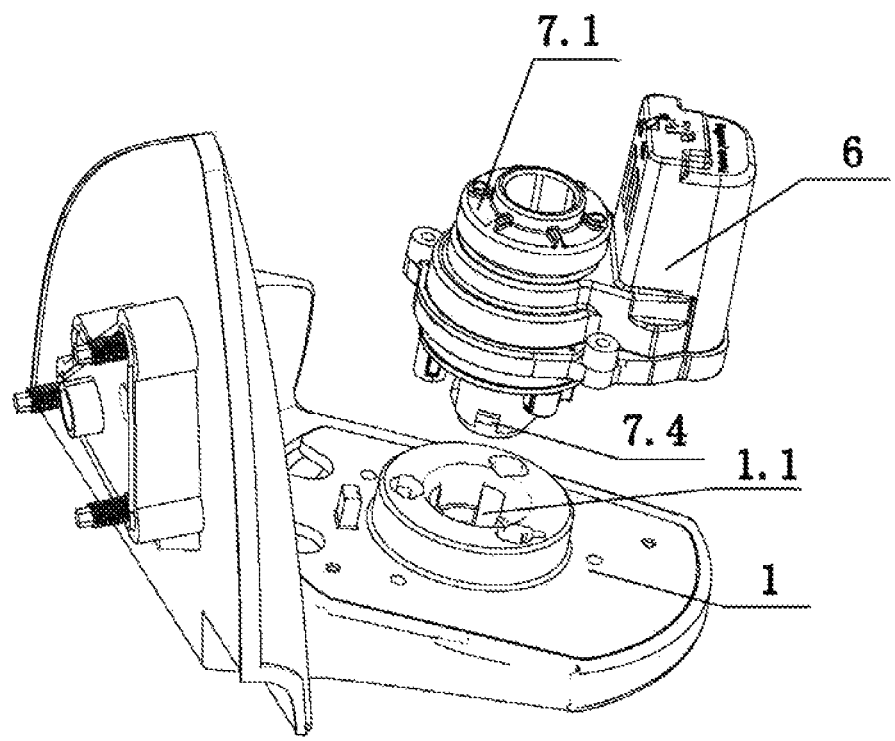
FIG. 6 is a schematic structural diagram for installation of an electric folding device for outer rearview mirror of a vehicle of the present disclosure.

When the vehicle is in a running state and the rearview mirror is unfolded, the connecting cam 4.3 is located on the first base cam 3.1, as indicated in FIG. 4, the convex portion of the connecting cam 4.3 is arranged on the convex portion of the first base cam 3.1, the second base cam 3.2 is embedded with the base cam 2.1 and the concave portion of the second base cam 3.2 is embedded with the convex portion of the base cam 2.1; during the folding process of the rearview mirror, the first base cam 3.1 and the connecting cam 4.3 slide relatively, the first base cam 3.1 embedded with the connecting cam 4.3, as indicated in FIG. 5, the convex part of the first base cam 3.1 is embedded with the concave part of the connecting cam 4.3, the second base cam 3.2 and the base cam 2.1 slide relatively, the second base cam 3.2 operates on the base cam 2.1, that is, the convex portion of the second base cam 3.2 operates on the base cam 2.1. The connecting cam 4.3, the first base 3.1, two foundation bed cam 3.2 and the base cam 2.1 are provided with three convex portions and three concave portions at even intervals along circumferential direction.

It further comprises a positioning mechanism for limiting the connecting piece 4, the positioning mechanism comprises a positioning member 9 for blocking and an annular positioning boss 4.1 arranged on the upper end of the connecting piece 4, the outer peripheral wall of the positioning boss 4.1 is provided with at least one positioning block 4.1.1 matched with the end of the positioning member 9, one side of the positioning block 4.1.1 is arc-shaped to rotate relatively to the positioning member 9 while the other side of the positioning block 4.1.1 can be used to abut against the end of the positioning member 9 as a stopping edge 4.1.2 for limitation.

When the vehicle is in the running state, the end of the positioning member 9 abuts against the stopping edge 4.1.2 of the limiting block 4.1.1. As indicated in FIG. 4, the convex portion of the connecting cam 4.3 is located on the convex portion of the first base cam 3.1, and the second base cam 3.2 is embedded with the base cam 2.1.

One end of the positioning member 9 is in rotatable connection with the foundation bed 3, an elastic component is arranged between the positioning member 9 and the base 2 for elastic reset, one side of the foundation bed 3 inner wall is provided with an inwardly-extending mounting platform 3.3, one end of the positioning member 9 is in a rotary sleeving installation with a vertically arranged rotating shaft 10 on the mounting platform 3.3, the elastic component is an elastic sheet 9.1 integrally formed with the positioning member 9, one side of the elastic sheet 9.1 abuts against the inner wall of the foundation bed 3, and the spacing for elastic displacement arranged between the other side of the elastic sheet 9.1 and the positioning member 9.

The electric driving unit includes a large gear 4.2 matched with transmission worm, and the large gear 4.2 is integrated with the connecting piece 4.

A plurality of convex blocks 4.4 are arranged, along the circumferential intervals of the lower end surface of the connecting piece 4, a slope surface 4.4.1 is arranged on the two sides of the convex block 4.4, a plurality of grooves 2.2 matched with the convex blocks arranged on the base 2 along the circumferential direction and corresponding with the intervals, the two sides of the groove 2.2 are respectively provided with an inclined surface 2.2.1 matched with the slope surface 4.4.1, the connecting cam 4.3 is arranged on the outer ring of the convex blocks 4.4 along the circumferential direction, a plurality of convex blocks 4.4 are arranged on the inner ring of the lower end surface of the connecting piece 4, the connecting cam 4.3 is located on the outer ring of the lower end surface of the connecting piece 4. The base cam 2.1 is arranged on the outer ring of the grooves 2.2 along the circumferential direction, a plurality of grooves 2.2 are correspondingly arranged on the inner ring of the upper end surface of the base 2, and the base cam 2.1 is correspondingly arranged on the outer ring of the upper end surface of the base 2.

A mounting cap 7.1 matched with the shell 6 is arranged at the upper end of the pin shaft 7, a plurality of fasteners 7.4 are provided at the lower end of the pin shaft 7 along the circumferential direction to buckle with the mounting part 1.1 of the mirror support 1.

The base 2 is fixedly connected with the pin shaft 7 through an annular clamping piece 11, a plurality of clamping pins 11.1 are obliquely arranged at the inner ring along the circumferential intervals, a tapered segment 7.2 arranged in the middle part of the pin shaft 7 corresponding to the position of the clamping piece 11, the pin shaft 7 is provided with a plurality of clamping grooves 7.3 along the circumferential direction to be clamped with the clamping pins 11.1.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

We claim:

1. An electric folding device for an outer rearview mirror of a vehicle, comprising a shell (6) fixedly installed on a mirror substrate (8) that carries a mirror, a foundation bed (3) with an open ring portion fixed on and rotatable with the shell (6), a base (2) fixed on a mirror support (1), a pin shaft (7) having a top cap and a bottom for connecting to the base, an electric driving unit secured within the shell for driving the shell (6) to rotate relative to the base (2) around an axis of the pin shaft (7), and a closed hollow connecting piece (4) having an upper end, a bottom and an interior annular ledge, a coil spring (5) disposed on the pin shaft with one end against an underneath of the cap and the other end against the annular ledge of the connecting piece for constantly urging the pin shaft and the connecting piece apart, wherein:

a cam assembly is located between the bottom of the connecting piece and a top of the base, the cam assembly is provided among the connecting piece (4), the foundation bed (3) and the base (2), during the electric folding process, driven by the electric driving unit, the cam assembly enables the foundation bed (3) to move upward relative to the base against the urging of the spring lifting the connecting piece and the shell as a single unit relative to the base when the driving unit rotates the shell in one direction and enables the foundation bed (3) to move downward relative to the base with the urging of the spring lowering the connecting piece and the shell as a single unit relative to the base when the driving unit rotates the shell in another direction, and wherein, the device includes a positioning mechanism for limiting rotation of the connecting piece (4) and thus the shell and the mirror, the positioning mechanism comprises a positioning member (9) pivotally attached at one end to a mounting platform (3.3) of the foundation bed for elastic reset of the rotation of the connecting piece, an elastic sheet is integrally formed with the positioning member (9), one side of the elastic sheet (9.1) abuts against the inner wall of the foundation bed (3), and a spacing for elastic displacement is provided between the other side of the elastic sheet (9.1) and the positioning member (9), an annular positioning boss (4.1) with an outer peripheral wall is arranged on the upper end of the connecting piece (4), the outer peripheral wall of the positioning boss (4.1) is provided with at least one positioning block (4.1.1), one side of the block (4.1.1) is arc-shaped while the other side of the positioning block (4.1.1) can be used to abut against the other end of the positioning member (9) as a stopping edge (4.1.2) for limiting rotation of the connecting piece.

2. The electric folding device of claim 1, wherein the electric driving unit includes a gear (4.2) matched with a transmission worm, and the gear (4.2) is integrally formed with the connecting piece (4).

3. The electric folding device of claim 1, wherein a mounting cap (7.1) matched with the shell (6) is arranged at an upper end of the pin shaft (7), a plurality of fasteners (7.4) are provided at a lower end of the pin shaft (7) along a circumferential direction to secure to a mounting part (1.1) of the mirror support (1).

4. The electric folding device of claim 3, wherein a lower end surface of the base (2) is fixedly connected with the pin shaft (7) through an annular clamping piece (11), a plurality of clamping pins (11.1) are obliquely arranged at an inner ring along circumferential intervals, a tapered segment (7.2) arranged in a middle part of the pin shaft (7) corresponding to a position of the clamping piece (11), the pin shaft (7) is provided with a plurality of clamping grooves (7.3) along the circumferential direction to be clamped with the clamping pins (11.1).

5. The electric folding device of claim 1, wherein the cam assembly comprises a connecting cam (4.3) formed on a lower end surface of the connecting piece (4), a first base cam (3.1) formed on an upper end surface of the foundation bed (3) matched with the connecting cam (4.3), a second base cam (3.2) formed on a lower end surface of the foundation bed (3), and a base cam (2.1) formed on an upper end surface of the base (2) and matched with the second base cam (3.2).

6. The electric folding device of claim 5, wherein the connecting cam (4.3) is positioned on the first base cam (3.1), and base cam (2.1) resides in the second base cam (3.2) when the vehicle motor starts; during a folding process of the rearview mirror, when the drive unit drives the shell to rotate, the foundation bed moves in slidable engagement and relative to the base and the connecting piece, thus the first base cam (3.1) slidably engages the connecting cam (4.3), and disengages from the base cam (2.1) such that the foundation bed moves upward relative to the base.

7. The electric folding device of claim 5, wherein an end of the positioning member (9) abuts against the stopping edge (4.1.2) of the positioning block (4.1.1) to stop rotation of the connecting piece when the vehicle motor starts.

8. The electric folding device of claim 5, wherein a convex block (4.4) with a pair of opposite sides extends downwardly from the bottom of the connecting piece (4), each of the sides has a sloped surface (4.4.1), the open ring portion of the foundation bed includes uniformly spaced upwardly extending portions formed in a top surface and uniformly spaced indentions formed in a bottom surface, the open ring portion is sandwiched between the bottom of the connecting piece and the top of the base, wherein the bottom of the connecting piece and the top of the base have cams formed, respectively, in a bottom surface and a top surface, the cams are complementarily shaped for slidable engagement with the upwardly extending portions and the indentions formed in the respective surfaces of the open ring portion when the drive unit rotates the shell and thus the foundation base and ring portion.

* * * * *